United States Patent [19]

Swanson

[11] 4,422,657

[45] Dec. 27, 1983

[54] CONNECTION BETWEEN TELESCOPIC SUSPENSION STRUTS FOR SNOWMOBILE SKIS AND STABILIZER MEMBER

[75] Inventor: Larry D. Swanson, Horicon, Wis.

[73] Assignee: Deere & Company, Moline, Ill.

[21] Appl. No.: 194,550

[22] Filed: Oct. 6, 1980

[51] Int. Cl.³ .............................................. B62B 17/04
[52] U.S. Cl. ..................................... 280/21 R; 280/25
[58] Field of Search ..................... 280/21 R, 21 A, 25; 180/190

[56] References Cited

U.S. PATENT DOCUMENTS

| | | | |
|---|---|---|---|
| 3,550,706 | 12/1970 | Watkins | 280/21 R X |
| 3,608,658 | 9/1971 | Woodfill | 280/21 R X |
| 3,835,947 | 9/1974 | Alexander, Jr. | 280/21 R |
| 3,913,692 | 10/1975 | Lohr et al. | 180/193 |
| 3,920,091 | 11/1975 | Kuwano | 280/21 R X |
| 3,930,547 | 1/1976 | West | 280/21 R X |
| 3,931,862 | 1/1976 | Cote | 280/21 R |
| 3,977,485 | 8/1976 | West et al. | 280/21 R |
| 4,319,656 | 3/1982 | Kobayashi | 280/16 X |
| 4,328,878 | 5/1982 | Yoshida | 280/16 X |
| 4,337,958 | 7/1982 | Witt et al. | 180/190 X |
| 4,342,372 | 8/1982 | Hayes | 280/21 R X |

Primary Examiner—Joseph Paul Brust

[57] ABSTRACT

A snowmobile has a front pair of skis carried by a front suspension, including right- and left-hand telescopic strut assemblies. The front suspension includes a U-shaped stabilizer bar having an intermediate section arranged for being loaded in torsion and right- and left-hand leg sections respectively linked to swivelly and telescopically mounted strut tubes so that during right- and left-hand turns, the stabilizer bar respectively acts to resiliently resist collapse of the right- and left-hand telescopic strut assemblies.

2 Claims, 3 Drawing Figures

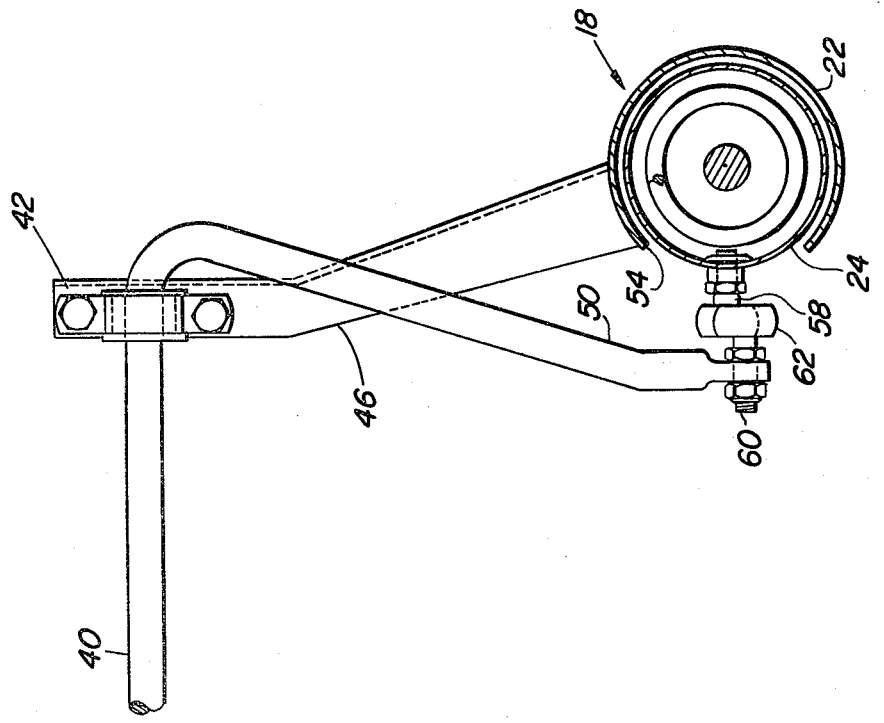
FIG. 3
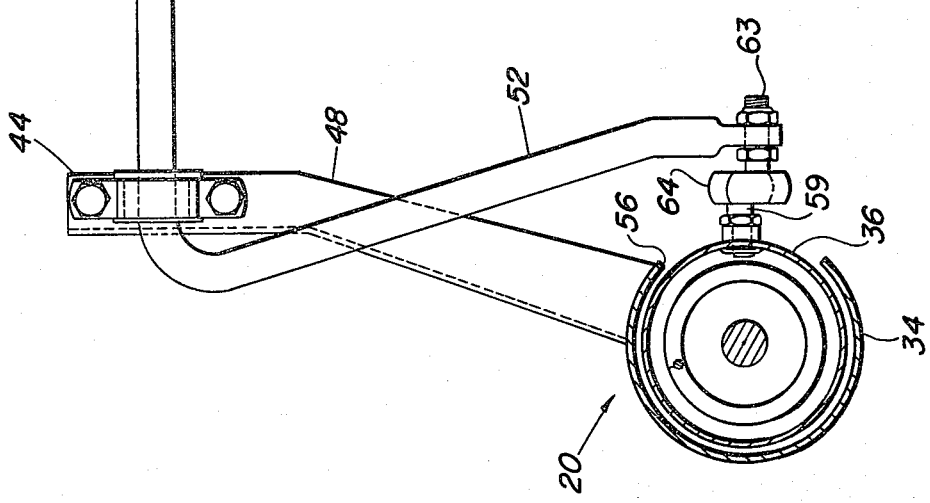

CONNECTION BETWEEN TELESCOPIC SUSPENSION STRUTS FOR SNOWMOBILE SKIS AND STABILIZER MEMBER

BACKGROUND OF THE INVENTION

The present invention relates to a front suspension system for a snowmobile and more specifically relates to snowmobiles equipped with front suspensions, including a pair of telescopic strut assemblies and a stabilizer member.

The prior art includes a snowmobile having a pair of telescopic strut assemblies that respectively include a pair of reciprocably and swivelly mounted tubes linked to the opposite ends of a stabilizer bar by linkages connected to the tubes such that only their movement during reciprocation is transferred to the stabilizer bar. Such a structure is illustrated in copending U.S. Application, Ser. No. 194,596, filed by Ebert et al on an even date with the instant application and having a common assignee.

SUMMARY OF THE INVENTION

According to the present invention, there is provided an improved front suspension for snowmobiles of the type equipped with right- and left-hand telescopic strut assemblies respectively having right-and left-hand swivelly and telescopically mounted tubes connected to the opposite ends of a stabilizer member.

A broad object of the invention is to provide a simple and reliable connection between telescopic and swivelly mounted tubes of telescopic strut assemblies and the opposite ends of stabilizer members.

A more specific object is to provide a connection, as set forth above, which operates during turning of the snowmobile to effect resistance to collapse of that strut assembly which is outside during the turn.

Yet another object is to provide a connection which comprises a pair of simple links, each having one end connected to a stud fixed to the top of a swivelly and telescopically mounted strut tube and having another end connected to an end of the stabilizer member.

These and other objects will become apparent from a reading of the following description, together with the appended drawings.

BRIEF DESCRIPTION OF THE DRAWINGS

FIG. 3 is a view looking downwardly in the direction of the axes of the struts at a section taken above and for the purpose of illustrating the connections between the stabilizer member and the struts.

DESCRIPTION OF THE PREFERRED EMBODIMENT

Figure 1:
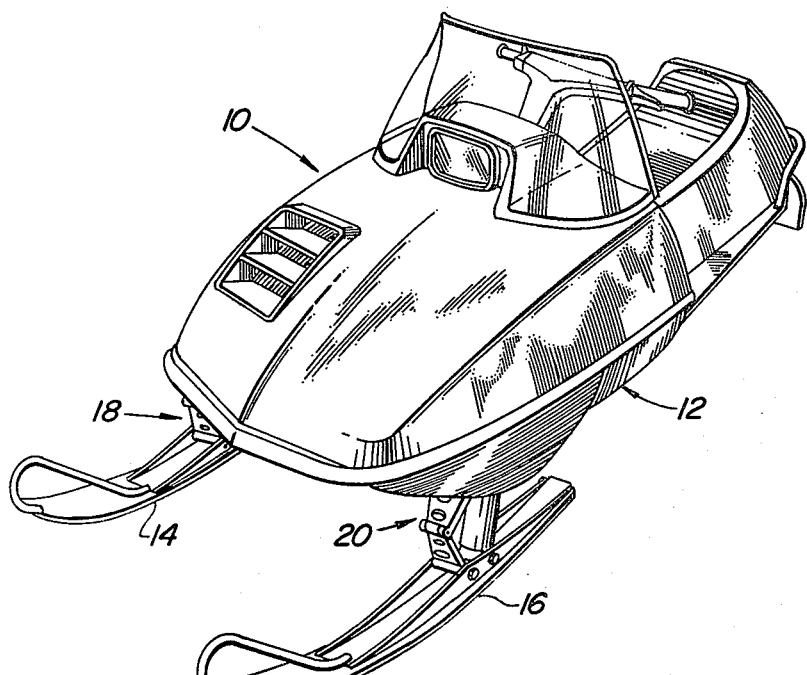
FIG. 1 is a left front perspective view of a snowmobile embodying the present invention.

Referring now to FIG. 1, therein is shown a snowmobile indicated in its entirety by the reference numeral 10. The snowmobile 10 includes a longitudinal main frame 12 having right- and left-hand steerable skis 14 and 16 respectively suspended therefrom by right- and left-hand telescopic strut assemblies 18 and 20. The assembly 18 includes an outer tube 22 fixed so as to form an integral part of the frame 12. Specifically, the frame 12 includes an inverted U-shaped cross member 23, and the tube 22 is fixed to one end of the member 23. Reciprocably and swivelly mounted in the tube 22 is an inner tube 24 having its lower end pivotally connected to the right-hand ski 14 by a bolt 26. A steering arm 28 is swivelly mounted on the outer tube 22 and is connected to the ski 14 by a hinge 30. A tie rod 32 interconnects the steering arm 28 and a similar steering arm (not shown) associated with the left strut assembly 20.

The left strut assembly 20 is similar in construction to the right strut assembly 18 and includes an outer tube 34 which is rigidly fixed to the other end of the cross member 23 of the frame 12 and has an inner tube 36 reciprocably and swivelly mounted therein.

Figure 2:
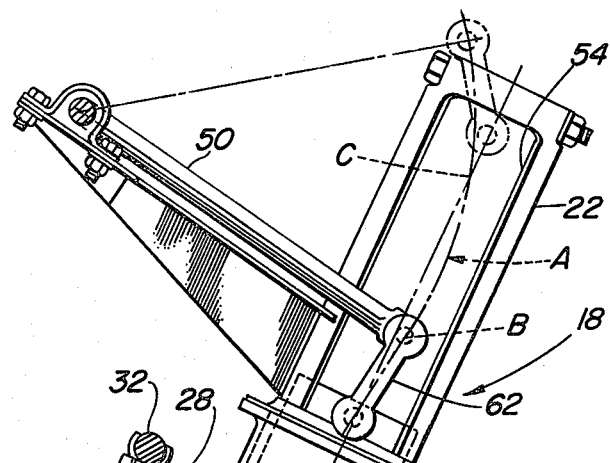
FIG. 2 is a left side elevational view of the right-hand telescopic strut, with parts omitted for clarity, along with a portion of the stabilizer member in solid lines, corresponding to a fully extended condition of the strut and in broken lines corresponding to a fully collapsed condition of the strut.
Figure 2:
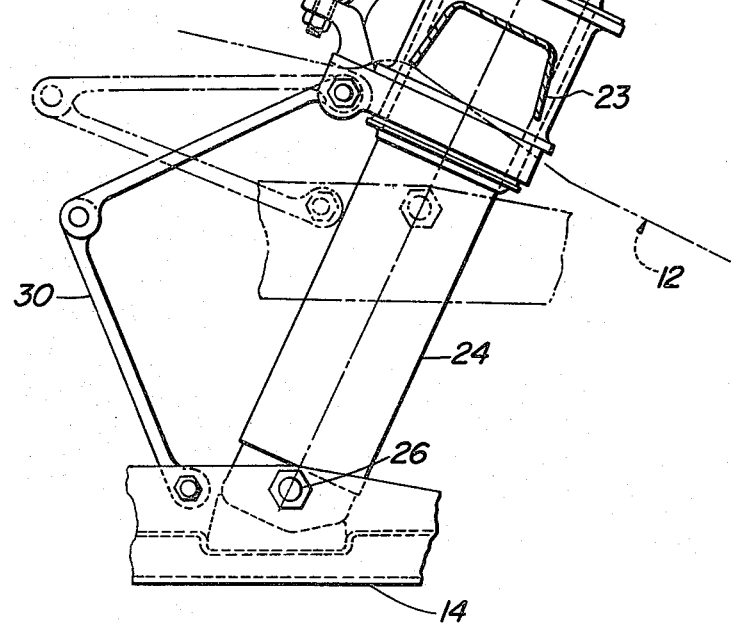

A stabilizer member 38, in the form of a U-shaped rod, includes a transverse section 40 serving as a torsion bar and being rotatably supported adjacent its opposite ends by right- and left-hand bearings 42 and 44 which are respectively at the forwards ends of left- and right-hand support arms 46 and 48 respectively cantilever-supported from the outer tubes 22 and 34 so as to also form an integral part of the frame 12. The stabilizer member 38 includes right- and left-hand leg sections 50 and 52 joined to opposite ends of its transverse section 40 and extending rearwardly to respective locations inwardly of and beside the outer tubes 22 and 34. Fixed to and projecting inwardly from upper inward locations of the inner tubes 24 through respective rectangular openings 54 and 56 provided in the outer tubes 22 and 34 are right- and left-hand studs 58 and 59. Connected between an outer end of a transverse stud 60 fixed in the rear end of the right-hand leg section 50 of the stabilizer member 38 and the stud 58 is a link 62 having ball connections at its opposite ends and similarly connected between a transverse stud 63 fixed in the leg section 52 and the stud 60 is a link 64. Referring to FIG. 2, it can be seen that with the ski 14 oriented for straight-ahead travel, the pivotal connection of the leg section 50 with the link 62 travels along an arc A and is located in or rearwardly of a transverse plane containing the center line of the strut assembly 18 as the connection moves along the arc A between points B and C. The distance travelled by the strut assembly in effecting the movement of the connection between the points B and C constitutes the greater portion of the distance travelled as it moves between its fully extended position, as shown in solid lines, and its fully collapsed or bottomed out position, as shown in dashed lines. This geometrical relationship applies equally to the strut assembly 20 and the link 64 associated therewith and is significant for reasons to be presently described.

Specifically, assuming that the snowmobile is initially travelling straight ahead and that the strut assemblies 18 and 20 are in respective positions disposing the links 62 and 64 in or rearwardly of a plane containing the longitudinal axes of the struts and that the snowmobile is then turned to the right, the inner tubes 24 and 36 of the right and left strut assemblies 18 and 20 will rotate clockwise, as viewed in FIG. 3. This rotation of the tubes 24 and 36 will respectively cause the link 62 to pull downwardly on the leg section 50 and the link 64 to push upwardly on the leg section 52 of the stabilizer member 38 to thus load the transverse section 40 such as to resist collapse of the left strut assembly 18 as is desired when turning to the right. The geometry of the stabilizer member 38 links 62 and 64 and the strut assemblies 18 and 20 will result in a similar resistance to collapse of the right-hand strut assembly 20 when the snowmobile is being turned to the left.

I claim:

1. In a snowmobile including a longitudinal main frame, right- and left-hand transversely spaced skis suspended from the forward end of the frame respectively by right- and left-hand telescopic struts which each include an outer upright tube fixed to the frame and an inner tube reciprocably and swivelly mounted in the outer tube, a stabilizer member including an intermediate transverse section rotatably mounted on the frame and having right- and left-hand leg sections at its opposite ends respectively connected to the respective inner tubes of the right- and left-hand telescopic struts, an improved connection between each of the inner tubes and the opposite leg sections, comprising: a stud fixed to the upper end portion of each inner tube and projecting crosswise to the length thereof; said outer tubes being provided with rectangular openings extending lengthwise thereof and respectively having the studs received therein, the openings having respective widths to provide clearance for permitting the inner tubes to swivel during steering and respective lengths for permitting the inner tubes to move between extended and retracted positions within the outer tubes; and a link connected between each stud and an end of a respective leg.

2. The snowmobile defined in claim 1 wherein the stabilizer member is U-shaped with the opposite leg sections thereof and the links being dimensioned and disposed such that when the inner tubes are in respective intermediate swivelled positions, the links are disposed rearwardly of a transverse plane passing through respective longitudinal axes of the telescopic struts throughout a substantial portion of the reciprocal movement of the inner tubes whereby swivel movement of the inner tubes from their intermediate positions during making right- and left-hand turns will respectively result in the links moving the leg sections of the stabilizer member such as to torsionally load the intermediate section in respective directions, tending to resist collapse of the left- and right-hand telescopic struts.

* * * * *